US009886654B1

(12) United States Patent
Almorshedi

(10) Patent No.: US 9,886,654 B1
(45) Date of Patent: Feb. 6, 2018

(54) ROTARY TRAY HOLDER

(71) Applicant: Almora, LLC, Pikesville, MD (US)

(72) Inventor: Adel Almorshedi, Sana'a (YE)

(73) Assignee: Almora, LLC, Pikesville, MD (US)

( * ) Notice: Subject to any disclaimer, the term of this patent is extended or adjusted under 35 U.S.C. 154(b) by 0 days.

(21) Appl. No.: 15/681,403

(22) Filed: Aug. 20, 2017

(51) Int. Cl.
*H01R 27/00* (2006.01)
*H01R 31/06* (2006.01)
*G06K 13/08* (2006.01)

(52) U.S. Cl.
CPC ..... *G06K 13/0831* (2013.01); *G06K 13/0825* (2013.01); *G06K 13/0862* (2013.01)

(58) Field of Classification Search
CPC ....... G06K 7/0021; H01R 27/00; H01R 31/06
USPC ......................... 439/630, 217, 218
See application file for complete search history.

(56) References Cited

U.S. PATENT DOCUMENTS

| | | | | |
|---|---|---|---|---|
| 7,731,538 | B2 * | 6/2010 | Kiryu ..................... | H01R 27/00 439/138 |
| 8,308,514 | B1 * | 11/2012 | Su ......................... | H01R 27/02 439/630 |
| 8,568,174 | B2 * | 10/2013 | Liu ........................ | H01R 27/02 439/630 |
| 2001/0010984 | A1 * | 8/2001 | Bricaud ............... | G06K 7/0013 439/630 |
| 2007/0087600 | A1 * | 4/2007 | Chen .................... | G06K 7/0021 439/159 |
| 2014/0099805 | A1 * | 4/2014 | Kutchery ............. | H04B 1/3816 439/76.1 |
| 2014/0113495 | A1 * | 4/2014 | Lim ....................... | H01R 27/00 439/630 |
| 2014/0154903 | A1 * | 6/2014 | Wang ....................... | G06K 7/00 439/152 |
| 2015/0079847 | A1 * | 3/2015 | Liu ...................... | H01R 12/721 439/630 |
| 2015/0207284 | A1 * | 7/2015 | Liu ...................... | G06K 7/0052 439/218 |

* cited by examiner

*Primary Examiner* — Gary Paumen
(74) *Attorney, Agent, or Firm* — Rahman LLC

(57) ABSTRACT

A rotary tray holder includes a tray holder comprising a side A and a side B, each side comprising at least one window to hold a SIM card; and a handle grabber that allows rotation of the tray holder to enable insertion of the tray holder in an electronic device with any of the side A and the side B of the tray holder, thereby enabling the SIM card located on the side oriented in the desired direction to be active, and making the SIM card located on the other side to take a standby position. The tray holder may include two partly overlapping windows oriented at an angle to each other. One of the overlapping windows holds the SIM card with contacts providing a standby position for the SIM card that may be repositioned in the other of the two overlapping windows to make the SIM card active.

20 Claims, 18 Drawing Sheets

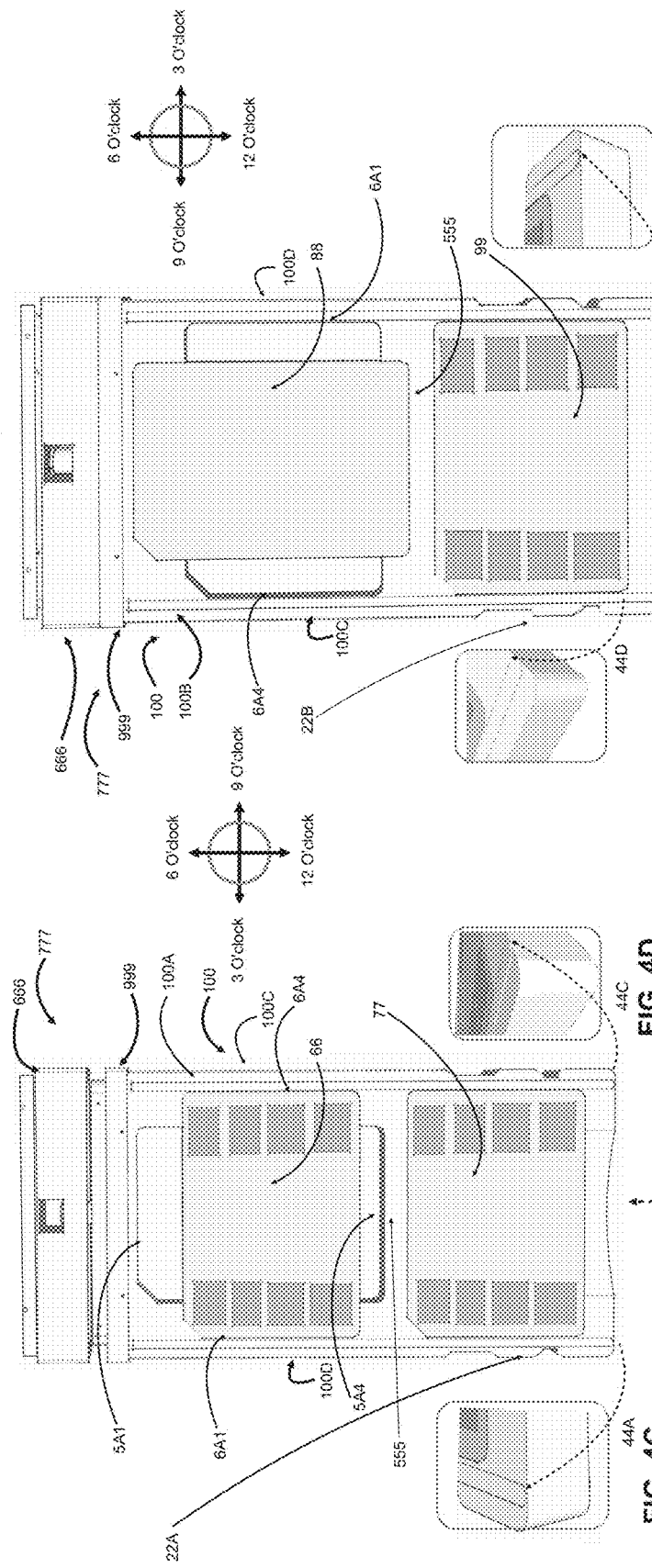

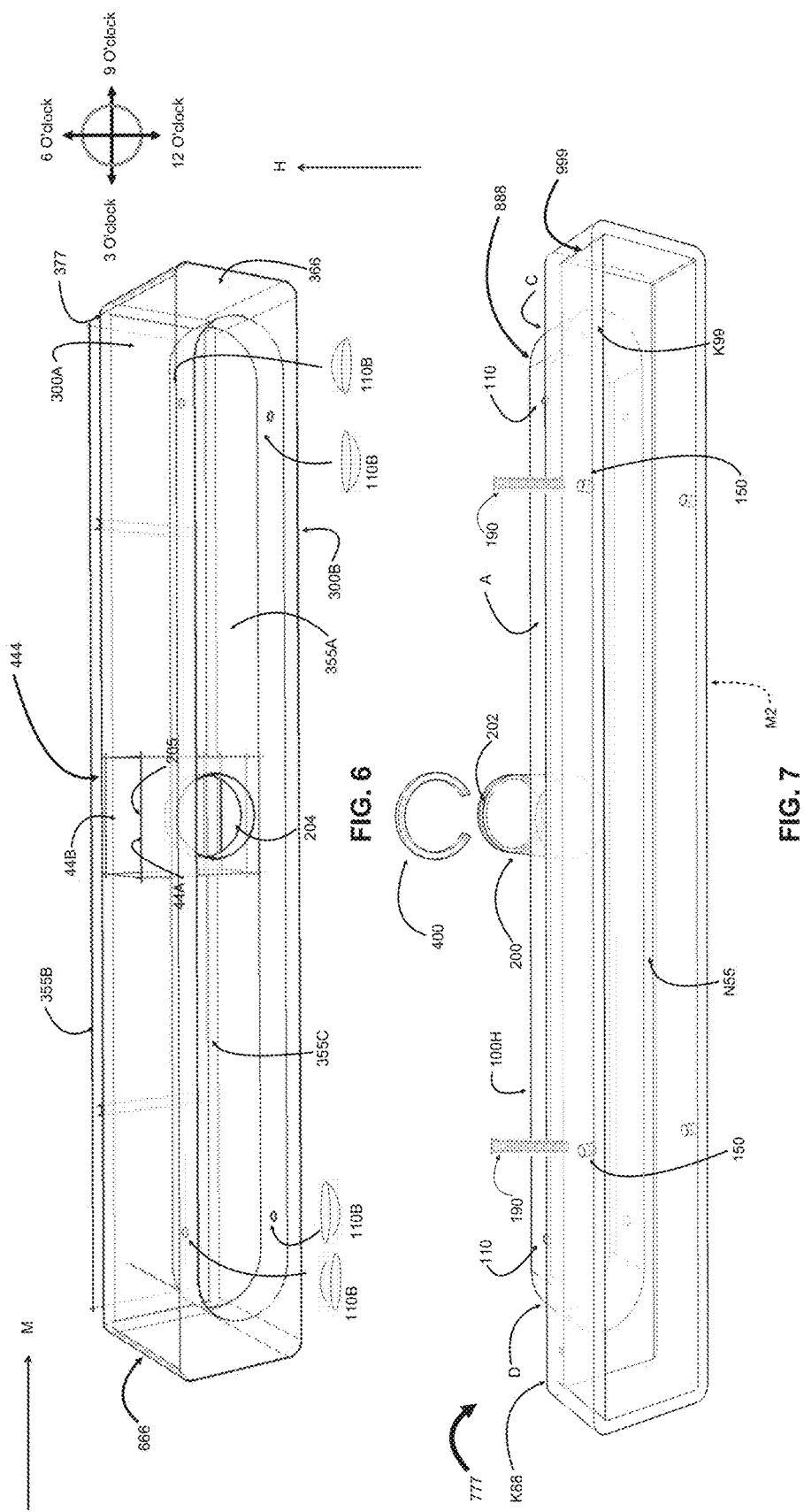

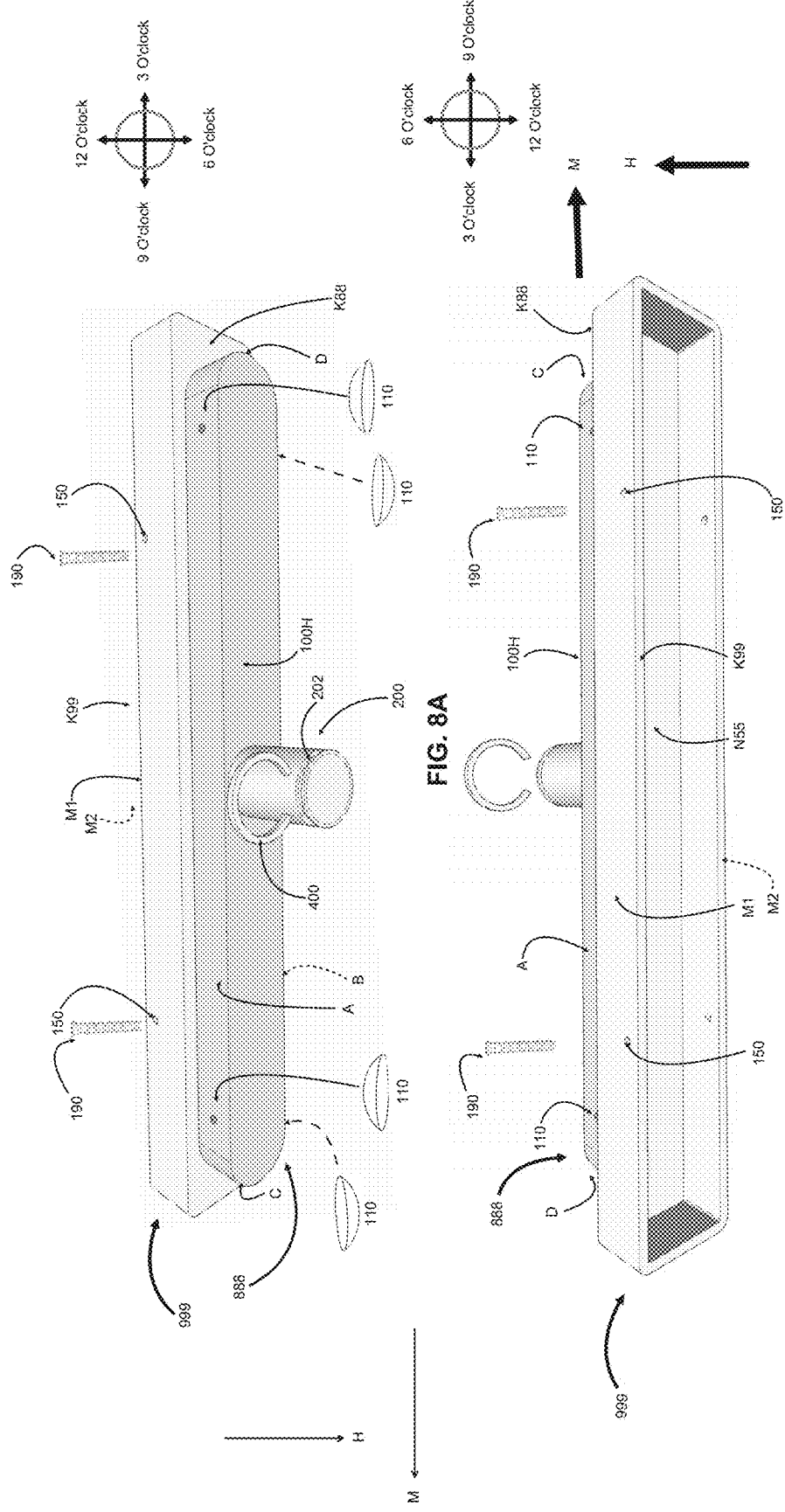

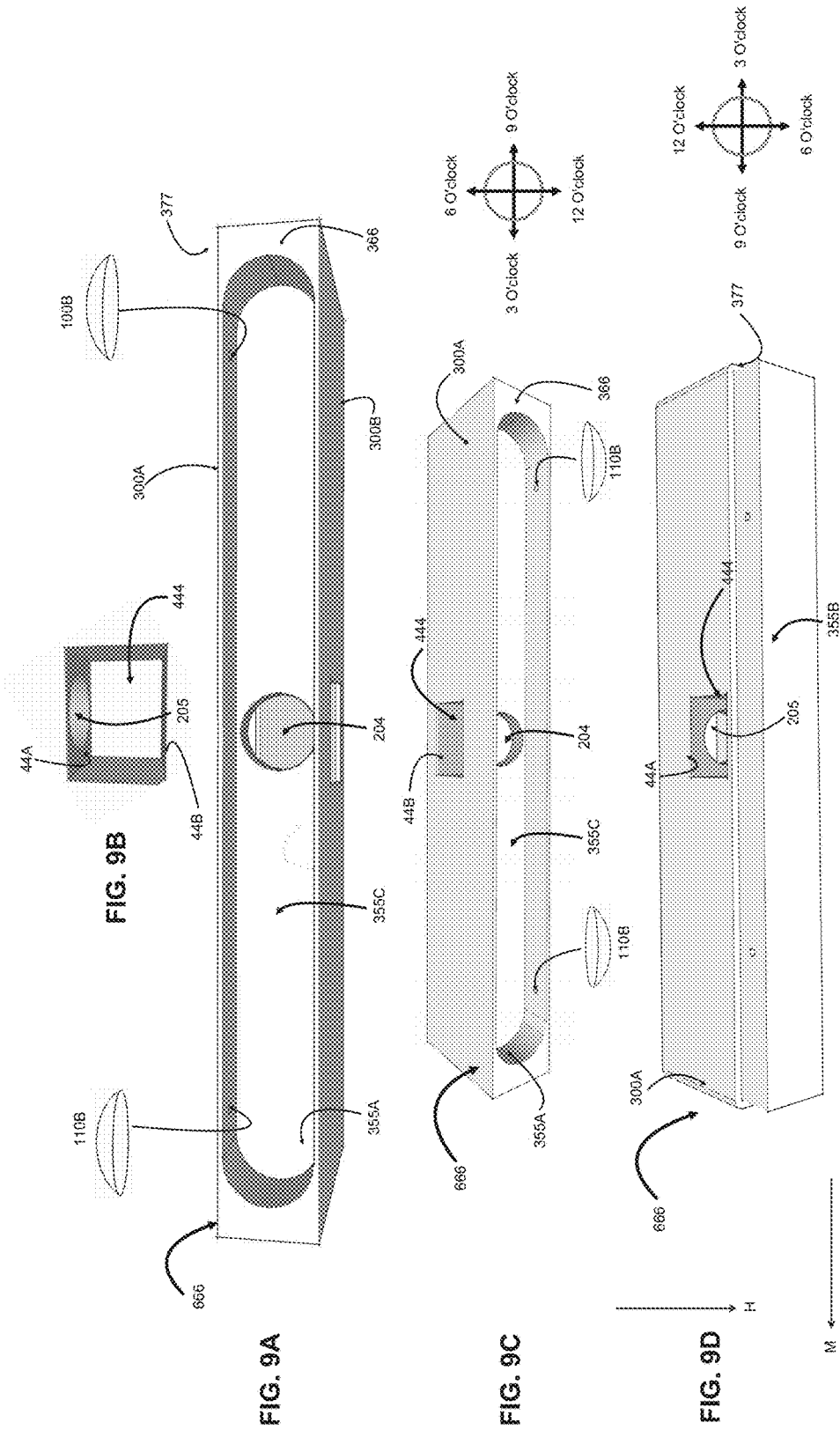

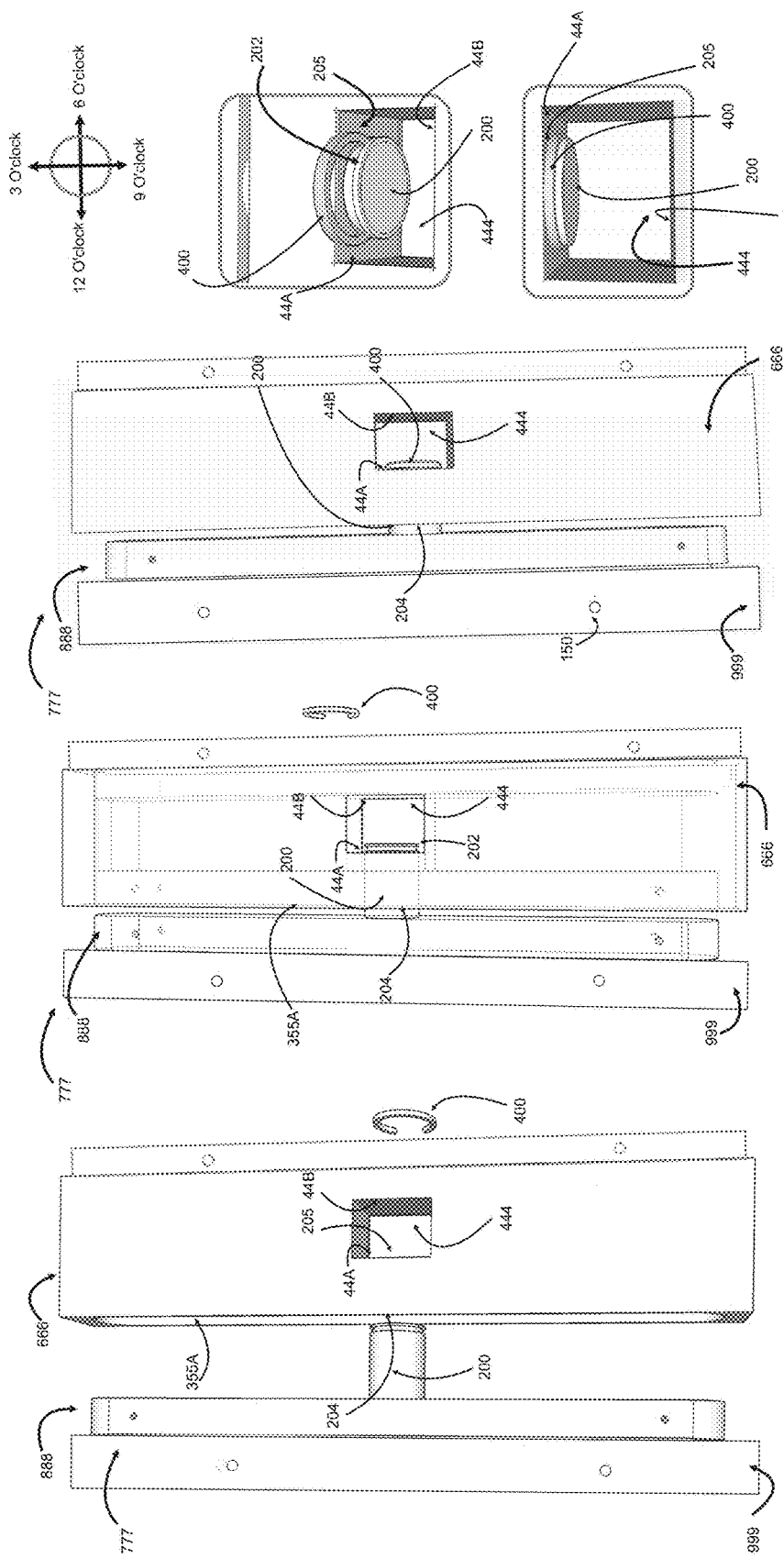

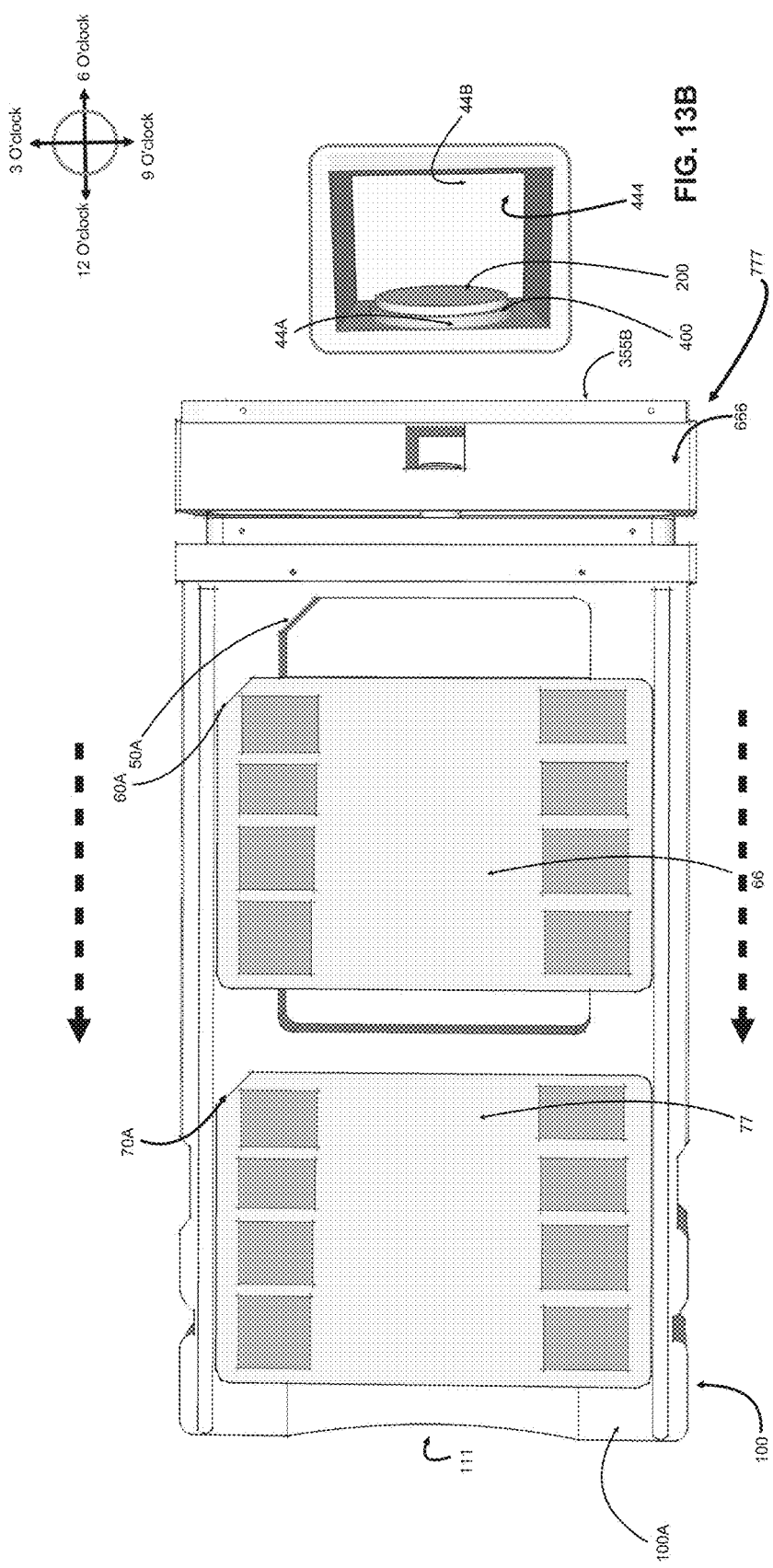

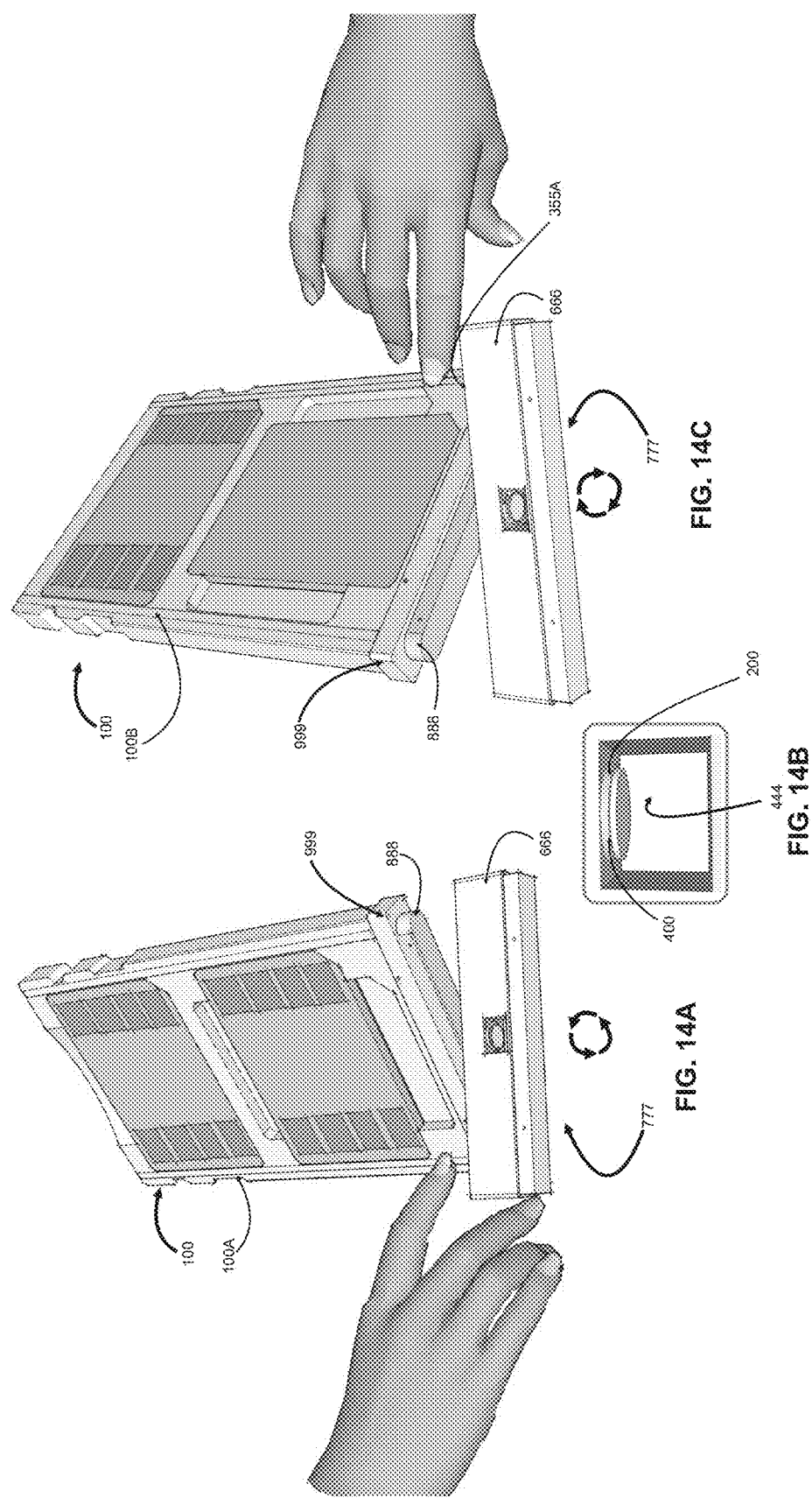

ROTARY TRAY HOLDER

BACKGROUND

Technical Field

The embodiments herein generally relate to tray holders that hold SIM or MMC cards, and slide out of their device such as a phone, tablet computer, and other such devices.

Description of the Related Art

A conventional tray holder is configured to hold one or more SIM or MMC cards, of either the same or different sizes, and thereafter insertion in an electronic device such as a smart phone, tablet, computer and like devices. Tray holders provide convenience of putting one or more SIM or MMC cards within a device, or removing them without comprising to open the device cover. Tray holders may be configured to hold the SIM cards in active positions or standby/standby positions, and when a SIM card that is presently in standby/standby position, is to be made active, a card that is in an active position and the card that is to be made active need to be removed from the tray for interchanging their positions.

SUMMARY

In view of the foregoing, an embodiment herein provides a rotary tray holder device comprising a handle grabber and a tray holder, wherein the handle grabber is configured to allow rotation of the tray holder to enable insertion of the rotary tray holder in an electronic device with any of two opposing faces of the tray holder oriented in a desired direction.

In an embodiment, the handle grabber comprises a main connector portion and a main receiver portion, wherein the handle grabber is arranged to be engaged and fixed with the tray holder via the main connector portion of the handle grabber, and wherein the main receiver portion is rotatably fixed with the main connector portion. Thus, the main receiving portion and assembly of the tray holder with the main connector portion may be rotated relative to each other in any direction; i.e., clockwise or anti-clockwise to any extent such as by 180 degrees or 360 degrees. In an aspect, the relative rotation enables any of the two faces of the tray holder to be oriented in a desired direction while orientation of the main receiving portion remains same for insertion in an electronic device.

In an embodiment, the main connector portion has a back female portion (i.e., located on a side facing the tray holder) and has a front male portion (i.e., located on a side opposite the tray side). The female portion is formed to receive the tray holder for fixing the tray holder with the main connector portion. The male portion is formed for engaging with a corresponding female portion of main receiving portion, and has a mounted shaft, the shaft comprising a groove formed to receive a snap ring.

In an embodiment, the main receiving portion has a front female portion (i.e., on a side facing the main connector portion) comprising an inner partition wall, and has a back portion (i.e., the side opposite the side that faces the main connector portion). The female portion is formed to receive and hold the male portion of the main connector portion. The partition wall has a hole located at center, and sized to slidably receive the shaft of the male portion of the main connector when the male portion of the main connector is received in the female portion of the main receiving portion.

In an embodiment, the main receiving portion further has a top side and an opposite side, and a receiving window in the form of a through aperture between the top side and opposite bottom side such that the hole located on the partition wall opens in the receiving window. The receiving window provides an access to detent the shaft by fixing the snap ring in the groove located on the shaft after the shaft has been received in the hole. The receiving window also provides space for travel of the shaft along the hole between a first position that corresponds to the end of the shaft touching wall of the receiving window towards back portion of the main receiving portion, and a second position that corresponds to the snap ring touching wall of the receiving window towards female portion of the main receiving portion. Thus, relative travel of the main connector portion and the main receiving portion along the direction of the shaft is restricted between the first position and the second position.

In an embodiment, travel between the first position and the second position is sized such that in the first position the male portion of the main receiving portion and the female portion of the main connector portion are fully engaged with each other, whereas in the second position the two are fully disengaged. Thus, in the second position the main receiving portion and the main connector portion may be rotated relative to each other along the axis of the shaft thereby changing their relative orientations.

In an embodiment, the female portion of the main receiving portion and the male portion of the main connector portion are shaped and sized to enable their engagement in any of two orientations that are 180 degrees apart so that the holder tray fixed to the main receiving portion may be rotated relative to the main connector portion, and engaged therewith through the main receiving portion in any of two desired orientations. To enable engagement of the female portion with the male portion, the male portion is sized lower than the female portion. The front opening or entrance of the front female portion may also be larger to allow ease of entry of the male portion.

In an embodiment, the male portion of the main connector portion has a top side, and an opposite side comprising a plurality of protruded male nodes of truncated spherical or semi-spherical shape. The plurality of protruded male nodes have a diameter that is lower than the diameter of a plurality of like-shaped round female receiving grooves that are formed in corresponding positions on an inner top side and an opposite inner side of the female portion of the main receiving portion. The male nodes engage with and fit inside the female receiving grooves of the front female portion to secure and hold the male portion inside the female portion when the male portion is engaged with the female portion.

In an embodiment, the tray holder (also referred to as main tray body or simply as a tray body, and all these terms used interchangeably hereinafter) is of a substantially flat shape comprising a top side (also referred to as side A and the two terms used interchangeably hereinafter) and an opposite bottom side (also referred to as side B and the two terms used interchangeably hereinafter), with each of the side A and the opposite side B comprising at least one slot/pocket/window to hold the SIM card, wherein depending on the orientation in which the tray body is inserted in an electronic device, the SIM card held within the at least one window on one of the side A and side B becomes active, and the SIM card held within the at least one window on the other side takes a standby position, and wherein insertion of the tray holder in the electronic device after the tray orientation has been changed by 180 degrees reverses the status of the SIM cards held on side A and side B.

In an alternate embodiment, each of the top side and the opposite bottom side have more than one slot/window to hold SIM cards, wherein at least one of the more than one windows on at least one of the top side and the opposite bottom side partly overlaps with another window being oriented at an angle to the other window, wherein one of the two overlapping windows is configured to hold a SIM card in a standby position comprising its contacts facing downward, and the other of the two overlapping window configured to hold the SIM card in an active position comprising its contacts facing upwards, and wherein the overlapping windows enable the change in status of the SIM card between standby and active by relocating the SIM card between the two overlapping windows.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 4A and 4B are exemplary perspective views illustrating the top side and bottom side, respectively, of the tray holder, according to the embodiments herein.

FIGS. 4C to 4G are exemplary perspective views illustrating slider portions on different sides of the tray holder, according to the embodiments herein.

FIG. 6 is an exemplary X-ray perspective view illustrating the main receiving portion of the handle grabber, according to the embodiments herein.

FIG. 7 is an exemplary X-ray perspective view illustrating the main connector portion of the handle grabber, according to the embodiments herein.

FIGS. 8A and 8B are exemplary perspective views illustrating the main connector portion of the handle grabber from the front and back side respectively, according to the embodiments herein.

FIGS. 9A to 9D are exemplary perspective views illustrating different aspects of the main connector portion of the handle grabber, according to the embodiments herein.

FIGS. 10A to 10D are exemplary perspective views illustrating different steps involved in the assembly of the main connector portion and the main receiver portion of the handle grabber, according to the embodiments herein.

FIGS. 13A and 13B are exemplary perspective views respectively illustrating the tray holder being pulled out of the handle grabber to rotate and position the snap ring working as a stop inside the receiving window, according to the embodiments herein.

FIGS. 14A to 14C are exemplary perspective views respectively illustrating the rotational range of the tray holder to the right and left directions, and the snap ring securing the rotational of the tray holder, according to the embodiments herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
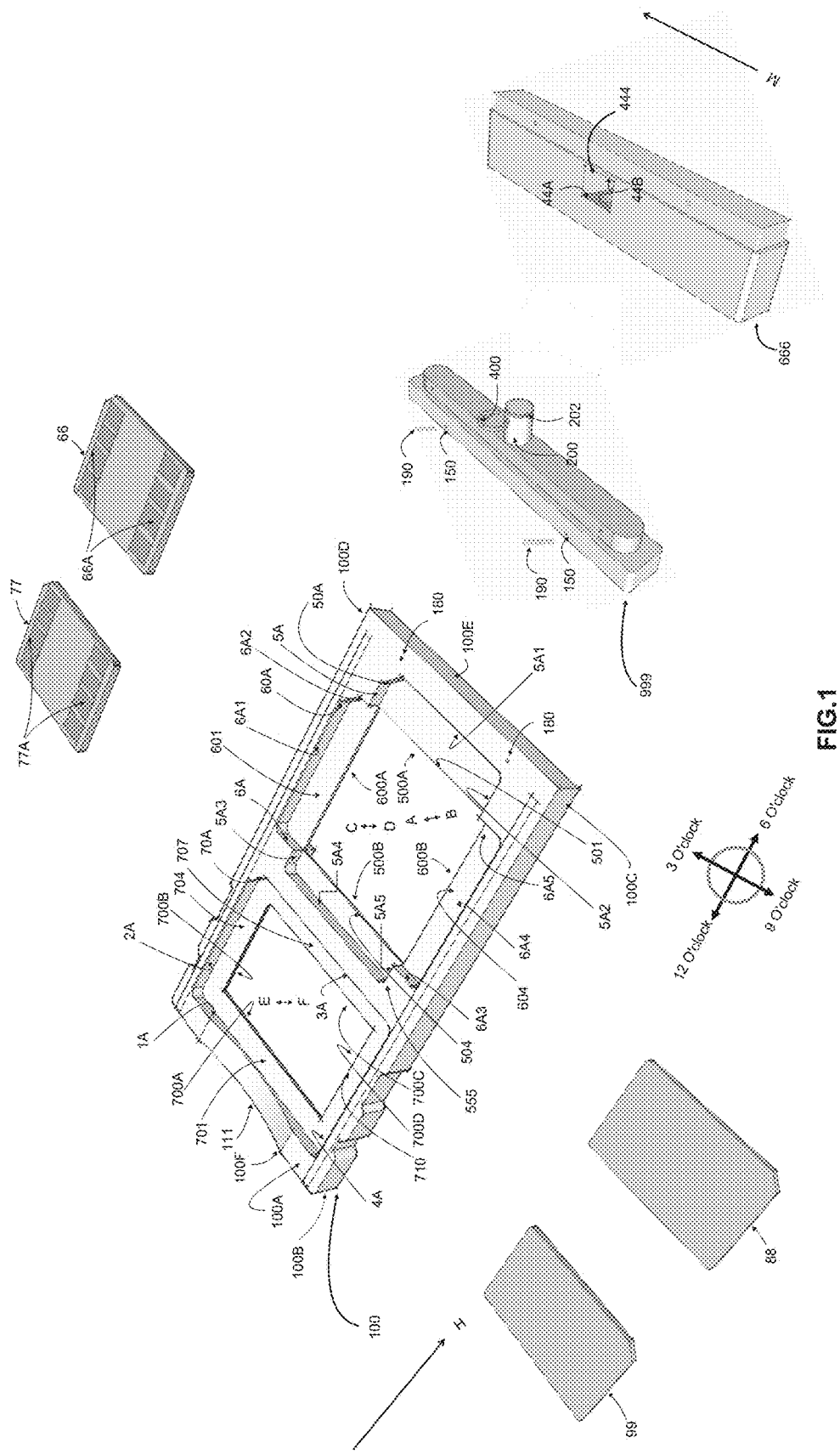
FIG. 1 is an exemplary exploded perspective view, illustrating a tray with a handle grabber, according to the embodiments herein.

Referring to FIG. 1, the disclosed rotary tray holder comprises a substantially flat main tray body 100, comprising a top side (or side A) 100A, and an opposite side (or side B) 100B. The top side 100A comprising a first top window/slot/pocket A, a second top window/slot/pocket C, and a third top window/slot/pocket E. Each of the windows/slot/pocket are configured to hold a SIM card or a MMC card. As may be seen from the exemplary illustration of FIG. 1, the first top window A and the second top window C partially overlap with each other, the two slots/window being oriented at angle to each other. For example, in the exemplary illustration of FIG. 1 the first top window A is shown arranged such that it is aligned in lengthwise direction H of the tray body 100, whereas the second top window C is aligned across the lengthwise direction H of the tray body 100. Thus, the two windows are at an angle of 90 degrees to each other. Because of overlap only one of the first top window A and the second top window C may hold a SIM/MMC card at one time.

In an embodiment, the first top window A may be configured to hold a SIM/MMC card in an orientation such that its contacts are not exposed for connectivity with electronic circuit of device when the tray holder is inserted in the device. For example, the contact points of a SIM/MMC card, when located in the first top window A, may face downward. Thus, the first top window A is configured to hold a SIM/MMC card as standby, wherein the card held in the first top window A may be removed and put in the second top window C to take an active position.

The third window E is separated from the overlapping first top window A and the second top window C by a separator 555 that extends between a part of right side 100D and left side 100C. The first window A and the second window C are formed by recessing the top side 100A that extends in direction and penetrates the opposite side 100B. The through/penetrating recess that forms the first window A is defined by sides 5A, 5A1, 5A2, 5A3, 5A4 and 5A5. The recess is divided in two by two dividers located in middle of thickness of the main tray body 100, such as a first divider and support portion 500A and a second divider and support portion 500B. The divided recess provides two opposite windows such that a fourth window B positioned opposite the first top window A is formed. Thus, the upper part of the recess divided by the two dividers forms the first window A that has bottom surfaces 501 and 504 provided by upper surface of the first divider and support portion 500A and the second divider and support portion 500B, respectively.

Likewise, a through/penetrating recess that forms the second window C is defined by sides 6A, 6A1, 6A2, 6A3, 6A4 and 6A5. The recess is divided in two by two dividers located in middle of thickness of the main tray body 100, such as a first divider and support portion 600A and a second divider and support portions 600B. The divided recess provides two opposite windows such that a sixth window F positioned opposite the second top window C is formed. Thus, the upper part of the recess divided by the two dividers forms the second window C that has bottom surfaces 601 and 604 provided by upper surface of the first divider and support portion 600A and the second divider and support portion 600B respectively.

Each of the two windows/pockets/slots may also incorporate a guiding edge that matches shape of SIM/MMC card to locate the card in a desired orientation, such as guiding edge 50A and guiding edge 60A, respectively.

As explained above, opposite side/side B 100B of the tray holder also comprises similar windows/pockets/slots for holding SIM/MMC cards. For example, there may be a fourth window B, positioned opposite the first top window A, and a fifth window D positioned opposite the second top window C. The fourth window B and the first top window A may be separated by the first divider and supporter portion 500A and the second divider and supporter portion 500B. Likewise, the second top window C and the fifth window D may be separated by the first divider and supporter portion 600A and the second divider and supporter portion 600B.

In an embodiment, the first divider and supporter portion 500A is formed from the back of the front side 100E, and the second divider and supporter portion 500B is formed from the front side of the separator 555, and are arranged to divide the recessed main tray body 100 into two opposite windows; i.e., the first top window A and the fourth window B, wherein both of these windows are arranged in lengthwise direction H of the tray body 100. Likewise, first divider and supporter portion 600A formed from a part of the back of the right side 100D, and second divider and supporter portion 600B formed from a part of the back of the left side 100C are arranged to divide the recessed main tray body 100 into two opposite windows; i.e., the second top window C and the fifth window D, wherein the second top window C and the fifth window D are arranged in widthwise direction M, of the main tray body 100.

As shown in the exemplary illustration of FIG. 1, the first window A being arranged in lengthwise direction H, and the second window C being arranged in widthwise direction M of the main tray body 100, cross each other, and therefore are arranged to receive only one card, such as first SIM card 66, at one time in different positions at the top side 100A of the main tray body 100. Similarly, the fourth window B and the fifth window D, being in similar orientations and located just below the first window A and the second window C, respectively, also cross each other at the opposite side 100B, and therefore may receive only one card, such as second SIM card 88, at one time in different position at the opposite side 100B of the main tray body 100.

In a manner similar to the first window A and the second window C, the third window E is formed by recessing the top side 100A that extends in the direction and penetrates the opposite side 100B, and has a first divider and supporter portion 700A formed from the back of the rear side 100F, has a second divider and supporter portion 700B formed from a part of the back of the right side 100D, has a third divider and supporter portion 700C formed from the back side of the separator 555, and has a fourth divider and supporter portion 700D formed from a part of the back of left side 100C. The divider and supporter portions 700A to 700D are arranged to divide the recess into two opposite windows such that a sixth window F is formed opposite the third window E. As shown, the recess that forms the third window E is defined by sides 1A, 2A, 3A, and 4A. The third window E further has bottom surfaces 701, 704, 707 and 710 provided by the first divider and supporter portion 700A, the second divider and supporter portion 700B, the third divider and supporter portion 700C, and the fourth divider and supporter portion 700D, respectively.

The third window E and the sixth window F are arranged in widthwise direction M of the main tray body 100, each of them being arranged to receive a card such as the third SIM card 77, and the fourth SIM card 99, respectively. Thus, the tray holder of the exemplary embodiments comprises six windows/slots/pockets, three configured on top side/side A 100A and three on the opposite side/side B 100B, that may at any time hold four cards 66, 77, 88, 99. It is to be appreciated that though the embodiment as illustrated in FIG. 1 shows the main tray body 100 configured to have six windows with a capability to hold four cards at a time, it is possible to have more windows in accordance with the embodiments herein. For example, it is possible to have eight slots with the capability to hold four cards, or eight windows with the capability to hold four cards or six cards, and all such variations are well within the scope of the embodiments herein.

Figure 2A:
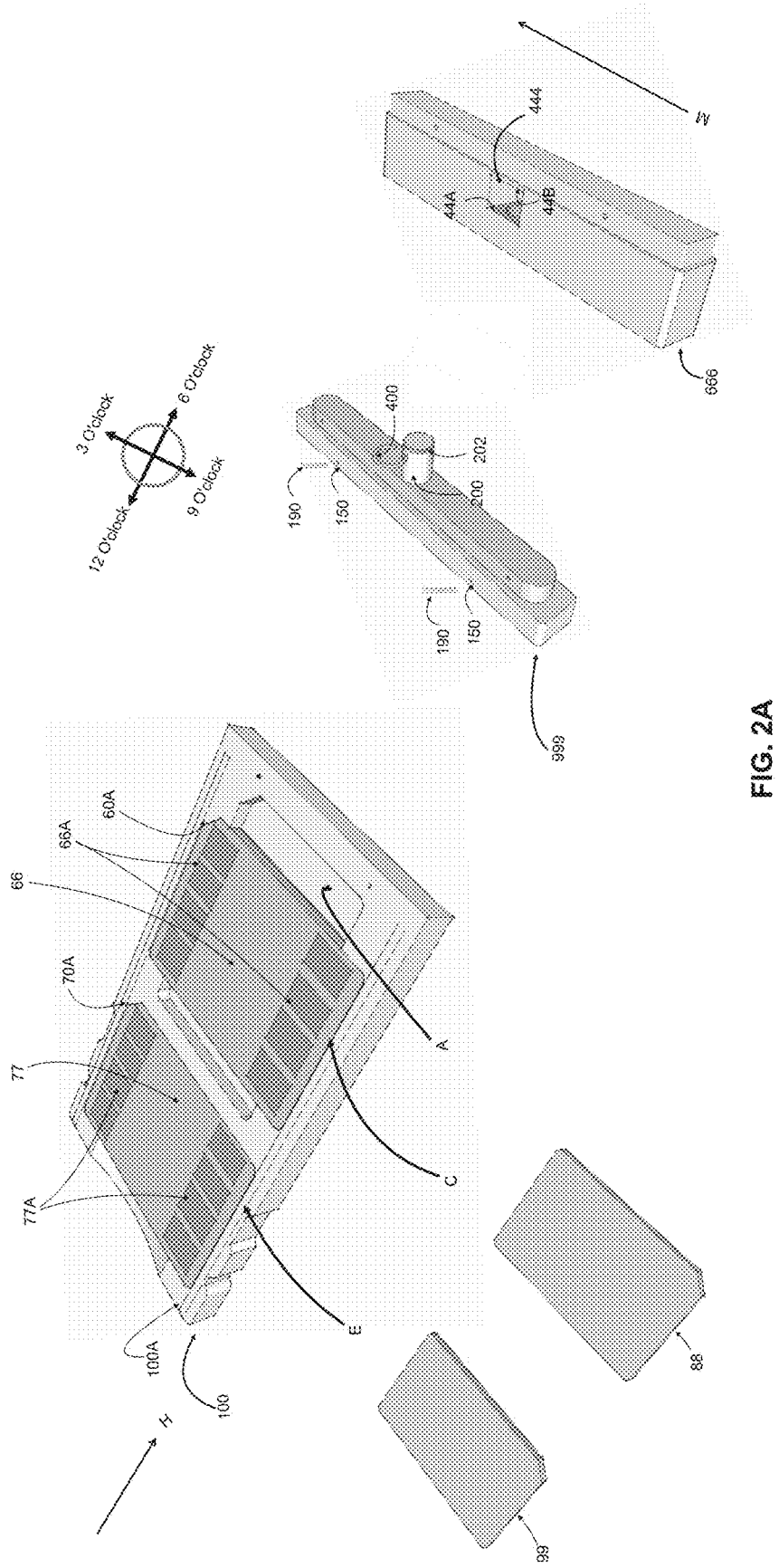
FIGS. 2A to 2C are exemplary perspective views illustrating the engagement relationship between slots and SIM cards with the SIM cards in active/standby positions, according to the embodiments herein.
Figure 2B:
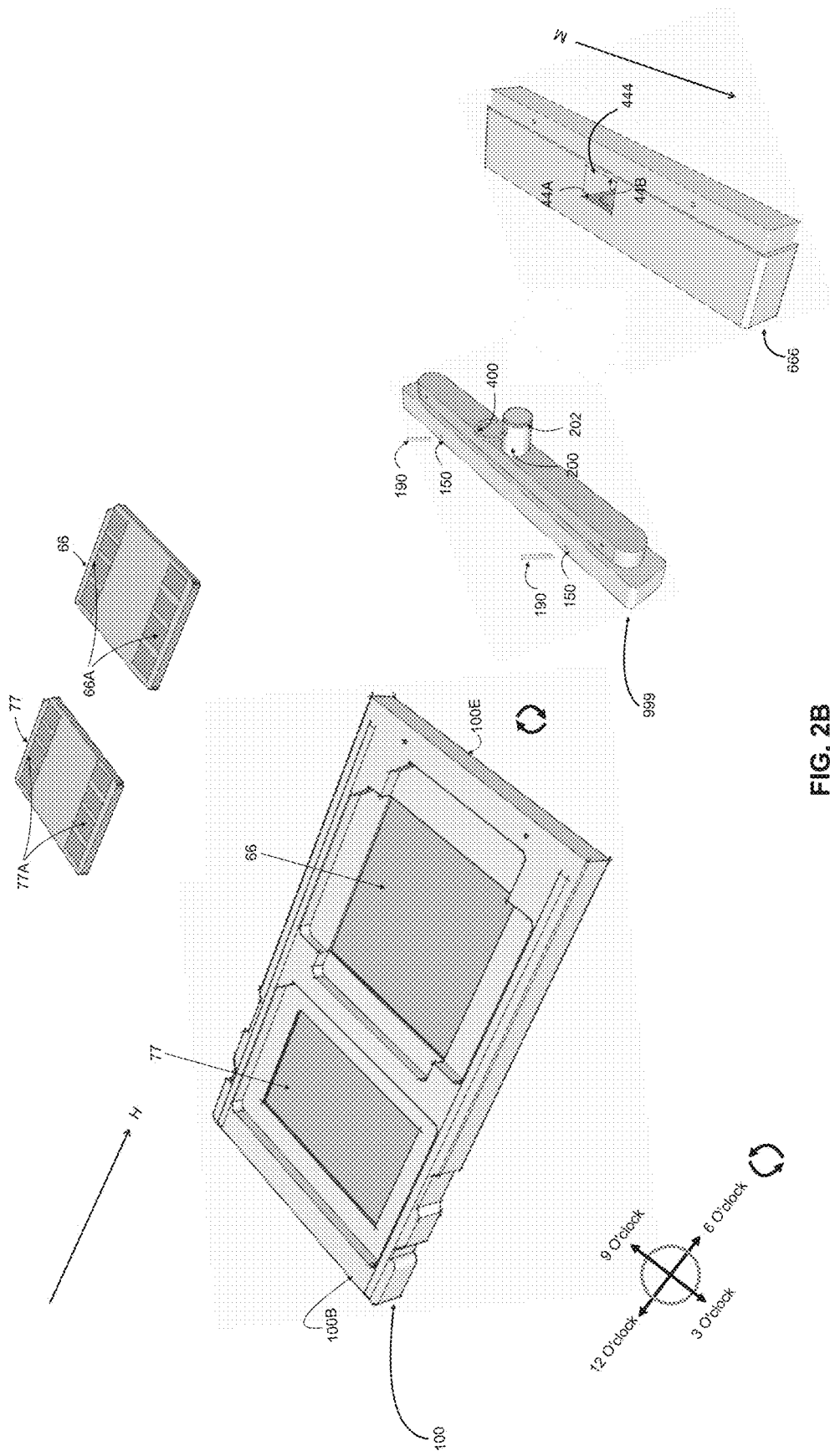
Figure 2C:
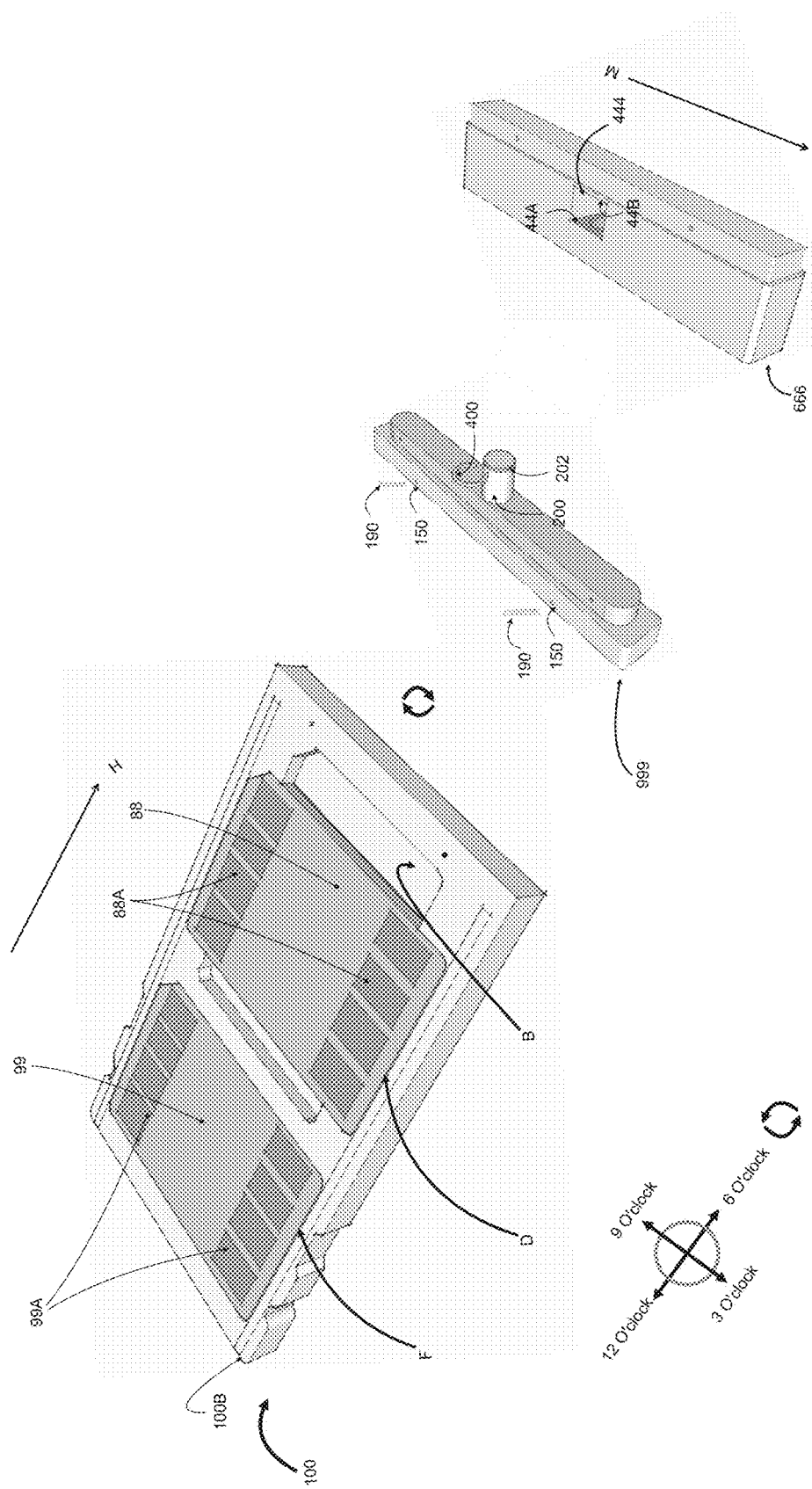

FIGS. 2A to 2C, with reference to FIG. 1, illustrate perspective views showing an engagement relationship between slots and SIM cards with the SIM cards in active/standby positions. As shown the second window/slot C and the third window/slot E on top side/side A 100A of the main tray body 100, may each hold a card such as a first SIM card 66 and a third SIM card 77, respectively. The guiding edges 60A and 70A of the second window C and the third window E, respectively, may be configured such that when the respective cards are positioned in the windows, their metallic contacts such as 66A and 77A are facing upward direction. Thus, when the main tray body 100 is inserted in an electronic device in an appropriate direction/orientation, SIM cards 66 and 77 become activated.

FIG. 2B shows the main tray body 100 from the opposite side/side B 100B, wherein the first SIM card 66 and the third SIM card 77 are already held in the second window C and the third window E, respectively. A second SIM card 88 and a fourth SIM card 99 may be installed in the fifth window D and the sixth window F as shown in FIG. 2C. In an example, the fifth window D and sixth window F may be solid to allow a user to apply a two-sided sticker (not shown) thereon to allow any of the second SIM card 88 and fourth SIM card 99 to be applied thereto to prevent the SIM cards 88, 99 from falling out. The second SIM card 88 and the fourth SIM card 99 installed in the respective windows may also have their respective metallic contacts 88A and 99A facing outward thus enabling their activation when the main tray body 100 is inserted in an electronic device in an appropriate direction/orientation.

Figure 3A:
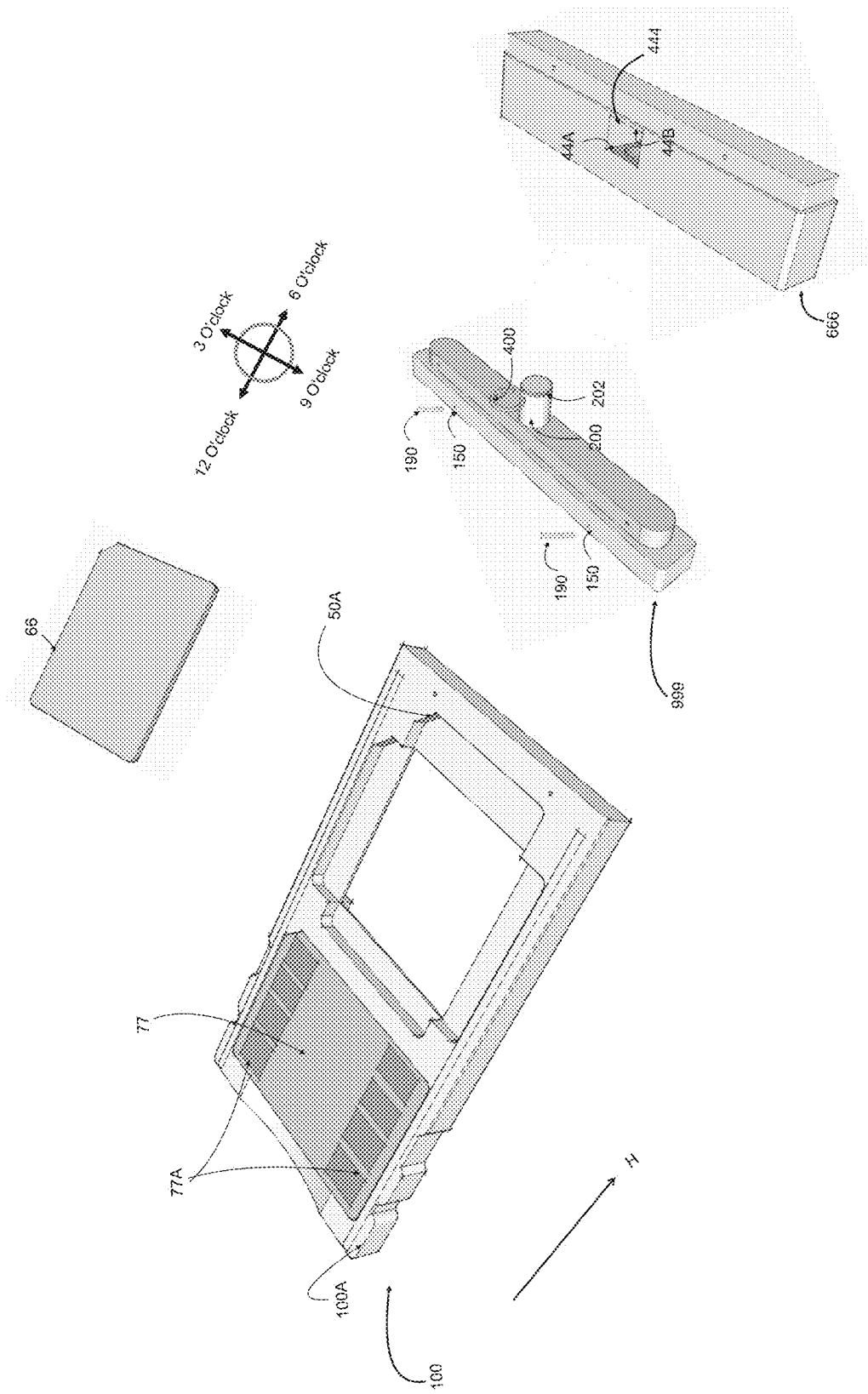
FIGS. 3A to 3D are exemplary perspective views illustrating engagement relationship between slots and SIM cards with the SIM cards in standby positions, according to the embodiments herein.
Figure 3B:
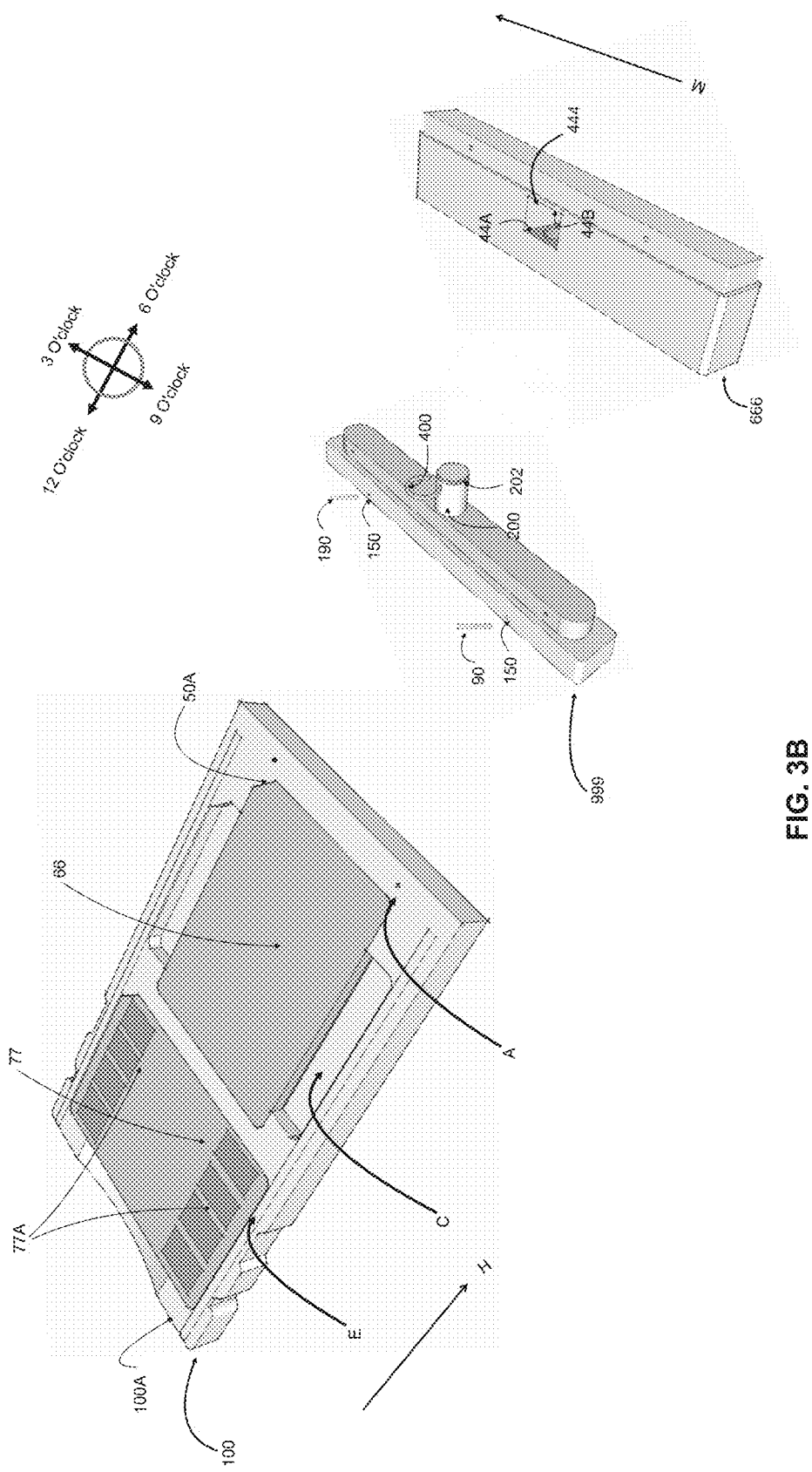
Figure 3C:
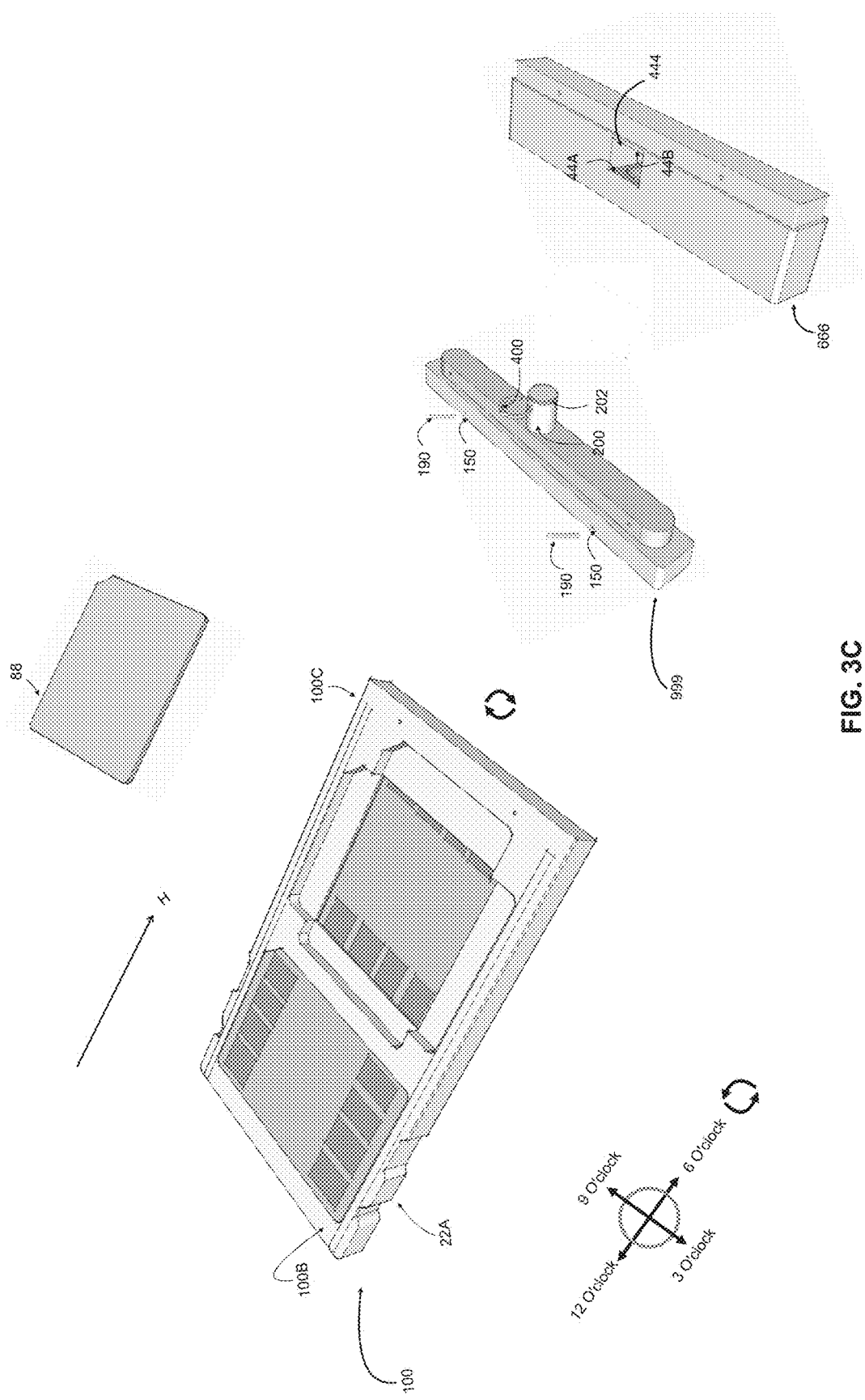
Figure 3D:
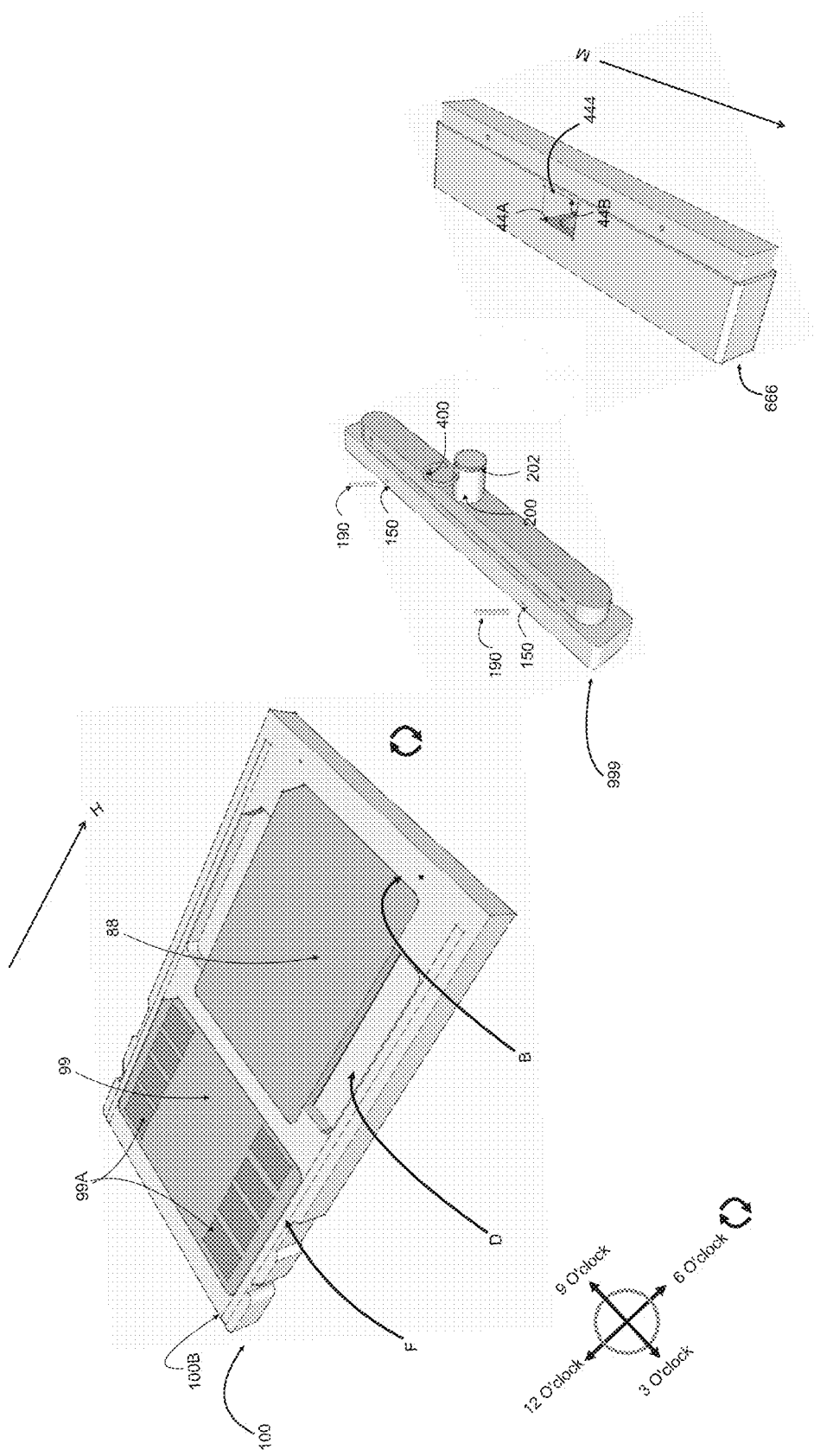

FIGS. 3A to 3D, with reference to FIGS. 1 through 2C, illustrate exemplary perspective views showing an engagement relationship between windows/slots and SIM cards with the SIM cards in standby positions. As shown, the first window A on top side/side A 100A of the main tray body 100 may hold the first SIM card 66 after it has been removed from the second window C. The guiding edge 50A of the first window A may be configured such that when the card is positioned in the first window A, metallic contacts are facing down ward direction. Thus, a card held in the first window A cannot be activated irrespective of orientation in which the main tray body 100 is inserted in a device. As shown in FIGS. 3C and 3D, the second SIM card 88 may also be removed from the fifth window D, and positioned in the fourth window B with the contacts facing down. Thus, the disclosed configuration of two overlapping windows/slots/pockets positioned at angle provides convenience of repositioning an active SIM card on the tray holder in standby position without the need for much additional space. For this, the two overlapping windows may be configured to hold a SIM card of the same size.

FIGS. 4A and 4B, with reference to FIGS. 1 through 3D, are exemplary perspective views illustrating the top side and bottom side of the tray holder with SIM cards. As shown, the disclosed rotary tray comprises a main tray body 100 and a handle grabber 777. The handle grabber 777 comprises a main connector portion 999 and a main receiver portion 666, and the front side 100E of the main tray body 100 is fixed to the main connector portion 999. In an aspect, the handle grabber 777 allows the main tray body 100 to rotate from the left direction to the right direction or to the opposite direction, from zero degrees up to 360 degrees, (the specifics of the engagement relationship is described in greater detail below).

The rear side 100F of the main tray body 100 has a recess opening portion 111, comprising a curved shape positioned on the top side 100A above the center of the rear side 100F, and formed by recessing downwardly that extends in the direction from the left side 100C toward the right side 100D. The recess opening portion 111 is formed to enable withdrawal of the third SIM card 77 from the third top window E, (refer to FIG. 3B). To withdraw the fourth SIM card 99 from the sixth window F, the third SIM card 77 may first be removed to gain access to the back side of the fourth SIM card 99 and push it out of the sixth window F. Accordingly, no recess similar to recess 111 is provided on side B of the main tray body 100. For the SIM cards inserted at the first window A, the first recessing portion of the second side wall 6A1, positioned at the back of the right side 100D, and the second recessing portion of the fifth side wall 6A4, positioned at the back of the left side 100C of the second window C, at the top side 100A, may be used to withdraw the first SIM card 66. When the first SIM card 66 is inserted at the top second window C that is in the widthwise direction M, the first recessing portion of the second side wall 5A1, positioned at the back of the front side 100E, and the second recessing portion of the fifth side wall 5A4, positioned at the front of the separator 555, of the first window A, at the top side 100A, may be used to withdraw the first SIM card 66. SIM cards positioned in window B and window D on the opposite side B that has similar construction, may likewise be removed using recesses as described above.

Referring to FIGS. 4A, 4C and 4D, with reference to FIGS. 1 through 3D, where a plurality of protrusive sliding portions are shown, the main tray body 100 comprises a plurality of rectangular protrusive sliding portions, such as first sliding portion 44A positioned at the top side 100A, towards and along right side 100D, and adjacent to the second window C and the third window E formed from a part of the top side 100A extending from front side 100E (refer to FIG. 1) towards the rear side 100F. A second top sliding portion 44C is positioned at the top side 100A towards and along left side 100C, and adjacent to the second window C, and the third window E on the top side 100A extending from the front side 100E towards the rear side 100F.

Referring to FIGS. 4B, 4E and 4F, with reference to FIGS. 1 through 4A, a third opposite sliding portion 44B is positioned at the opposite side 100B, towards and along right side 100D adjacent to the fifth window D and the sixth window F, and formed from a part of the opposite side 100B extending from the front side 100E towards the rear side 100F. A fourth opposite sliding portion 44D is positioned at the opposite side 100B, towards and along the left side 100C, adjacent to the fifth window D and the sixth window F, formed from a part of the opposite side 100B, extending from the front side 100E towards the rear side 100F. The four protrusive sliding portions comprising substantially rectangular cross section, and positioned along the sides on both sides of the main tray body 100 are configured to mate with receiving guide rails inside a connector of an electronic device, and to slide along the guide rail when the tray holder is inserted in the electronic device (not shown in the drawings).

Referring to FIGS. 4A and 4B, right side 100D and left side 100C of the main tray body 100 incorporate two opposing receiving grooves, each receiving groove formed by two notches. The first receiving groove 22A may be positioned at sidewall of right side 100D adjacent to the third top window E and the sixth opposite window F. A first notched and a second notched are formed on the right side 100D leaving a middle partial portion to form the first receiving groove 22A of the right side 100D. Likewise, the second receiving groove 22B is positioned on the side wall of left side 100C adjacent to the third top window E and the sixth opposite window F formed by a first notched groove and a second notched groove on the left side 100C, that leave a middle partial portion of the left side 100C. The two receiving grooves 22A and 22B are used to receive a resilient arm of a connector of an electronic device, where the resilient arm is used to hold and abut with the right side 100D and the left side 100C of the main tray body 100 through the receiving grooves 22A and 22B.

Figure 5:
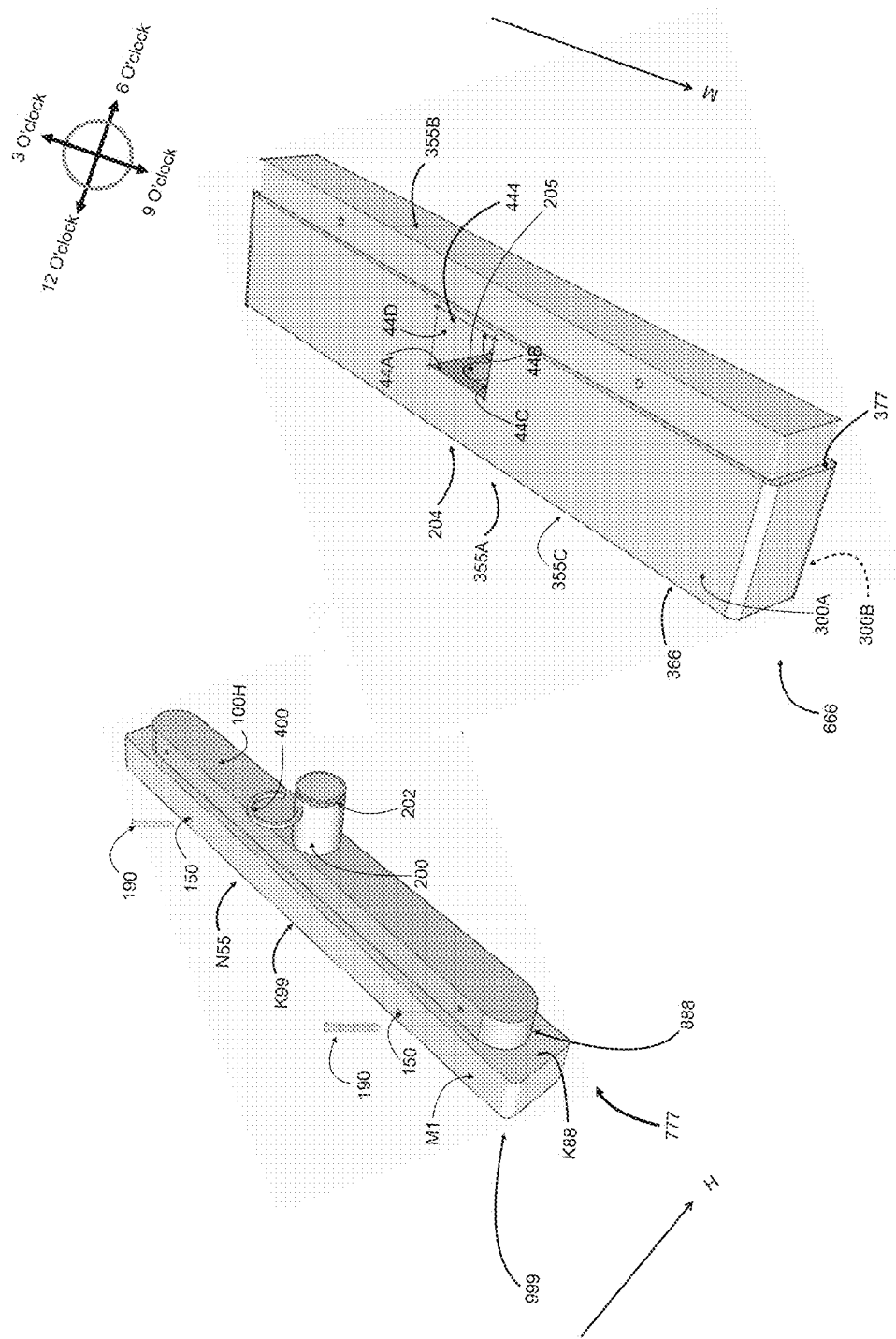
FIG. 5 is an exemplary exploded view illustrating constituent parts of the handle grabber, according to the embodiments herein.

Referring to FIGS. 1 and 5, handle grabber 777 comprises a main connector portion 999 and a main receiver portion 666. Further referring to FIGS. 5, 7, 8A and 8B, with reference to FIGS. 1 through 4G, the main connector portion 999 has a front side K88, and has a backside K99. A back female entrance portion N55 is formed on the backside K99, and a front male portion 888 is formed on the front side K88. The front male portion 888 has a front side 100H, has a mounted shaft 200, extending out of the front side K88 of the connector portion 999. The shaft 200 comprises a circumferential groove 202 configured to receive a snap ring such as snap ring 400.

Referring to FIGS. 5, 6 and 9A to 9D, with reference to FIGS. 1 through 4G, the receiving portion 666 has a top side 300A, a bottom side 300B, a front side 366, and an opposite back side 377. The front side 366 comprises a front female portion 355A that is formed by recessing the surface of the front side 366, and extents horizontally in an inward direction toward the back side 377, penetrating the front side 366. The front female portion 355A is limited by the inner partition wall 355C. The receiving portion 666 further has a back male portion 355B formed on the back side 377 of the main receiving portion 666, and is configured to connect with a hand gripping portion (not shown in the drawings). The partition wall 355C of the front female portion 355A has a hole 204 located in its center, extending in the direction of the back side 377.

Main receiving portion 666 further comprises a receiving window 444 in the form of a through aperture between the top side 300A and the opposite bottom side 300B, and has a front wall 44A and a back wall 44B. The hole 204 located on the partition wall 355C opens on the front wall 44A of the receiving window at its end 205. The receiving window 444 provides an access to detent the shaft 200 by fixing the snap ring 400 in groove 202 located on the shaft 200 after the shaft 200 has been received in the hole 204. Once the snap ring 400 has been located/fixed in the groove 202 the shaft is securely held in the hole 204 and cannot be removed. In one example, window 444 may extend from the left side to the right side and may also extend towards the backside or through to the backside of the main receiving portion 666.

The receiving window 444 also provides space for travel of the shaft 200 along the hole 200 between a first position that corresponds to end of the shaft 203 touching the back wall 44B of the receiving window 444, and a second position that corresponds to the snap ring 400 touching the front wall 44A of the receiving window 444. Thus, relative travel of the main connector portion 999 and the main receiving portion 666 along the direction of the shaft 200 is restricted between the first position and the second position.

Referring to FIGS. 8A and 8B, with reference to FIGS. 1 through 7, the main connector portion 999 has a male portion 888 formed on the front side K88, and has a top side A, a bottom side B, a left side C towards the nine o'clock direction, a right side D towards the three o'clock direction and a front side 100H towards the six o'clock direction. The male portion 888 may have a smaller size/cross-section than the front female portion 355A of the main receiving portion 666, thereby allowing the male portion 888 to easily fit and engage with the front female portion 355A. Also, the height of the male portion 888 may be smaller than the depth of the female portion 355A allowing the surface area of the front side K88 to abut with the front side 366 of the main receiving portion 666, when the male portion 888 is engaged with the front female portion 355A.

Referring to FIG. 8A, the male portion 888 has a top side A, and an opposite side B. The top side A and the opposite side B comprise a plurality of protruded spherical male nodes 110 facing in an upward direction. The nodes 110 may be formed on both the top side A and at the opposite side B of the male portion 888, and may be positioned along a center line of the male portion 888. There may be corresponding spherical shaped female receiving grooves 110B configured on the walls of the front female portion 355A in corresponding positions. The female receiving grooves 110B may have a larger size than the nodes 110 so that the plurality of round nodes 110 may comfortably fit inside the female receiving groove 110B. The protruded nodes 110 and the female receiving groove 110B that are arranged in corresponding positions to mate and engage are meant to secure and hold the male portion 888 inside the front female portion 355A.

Referring to FIGS. 1 through 8B, the main connecter portion 999 comprises a plurality of holes 150 through top side M1, and opposite side M2. The holes 150 are configured to match holes 180 that are provided on the main tray body 100 at its front side 100E (refer FIG. 1). The holes 180 of the tray body 100, and the two through holes 150 of the main connecter portion 999 may enable assembly of the main tray body 100 with the main connecter portion 999 using screws or pins, such as screws 190, after the front side 100E of the main tray body 100 has been positioned in the back female portion N55.

FIGS. 10A to 10D, with reference to FIGS. 1 through 9D, illustrate exemplary perspective views showing a sequence of the assembly of the main connector portion 999 and the main receiver portion 666 to form handle grabber 777, wherein FIG. 10A shows the main connector portion 999 and the main receiver portion 666 positioned in their correct orientation for assembly. During assembly, the shaft 200 of the main connector portion 999 shall be the first entry into the front female portion 355A and thereafter in the hole 204 of the main receiver portion 666 as shown in FIG. 10B. In this position, the groove 44A shall be accessible from the receiving window 444, and the snap ring 400 may be positioned in the groove 44A as shown in FIGS. 10C and 10D.

As the main connector portion 999 and the main receiver portion 666 are brought further closer, the male portion 888 may take entry into the front female portion 355A, and after some travel the nodes 110 shall engage with walls of the front female portion 355A and may resist further movement. However, height of the nodes 110 being controlled to enable assembly with some effort, the two may be brought further closer so that the male portion 888 is fully home within the front female portion 355A. In this condition, the nodes 110 shall engage with respective female receiving groove 110B to prevent easy separation of the male portion 888 and the front female portion 355A.

Figure 11A:
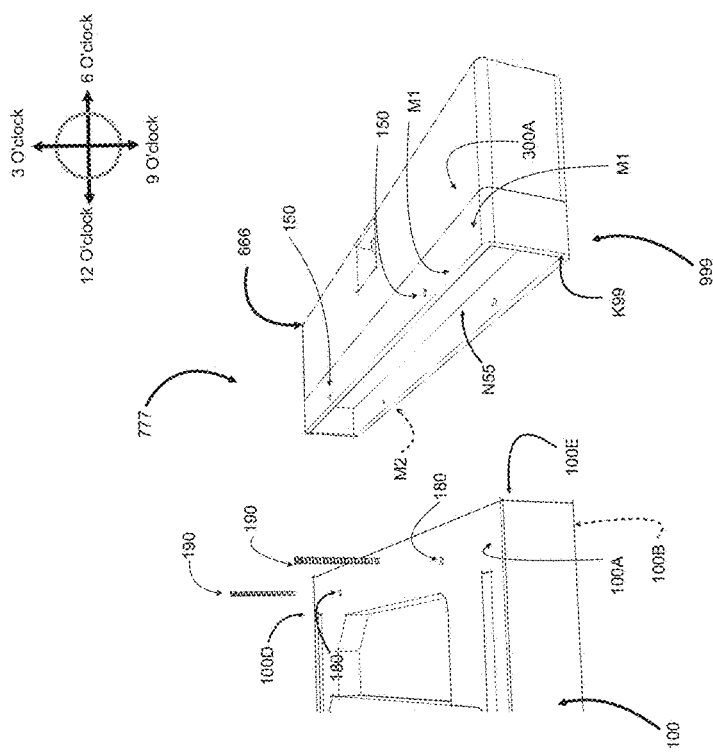
FIGS. 11A to 11C are exemplary perspective views illustrating different steps involved in the assembly of the tray holder with the handle grabber to complete the rotary tray holder, according to the embodiments herein.
Figure 11B:
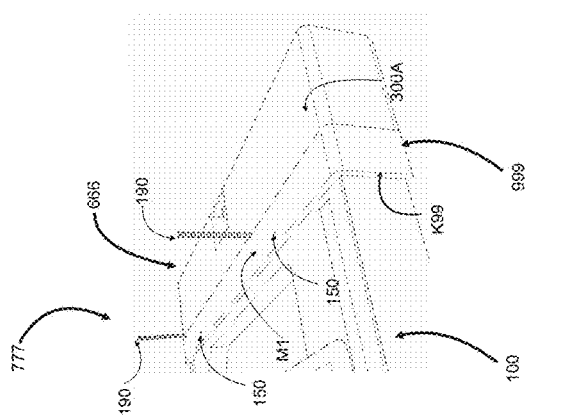
Figure 11C:
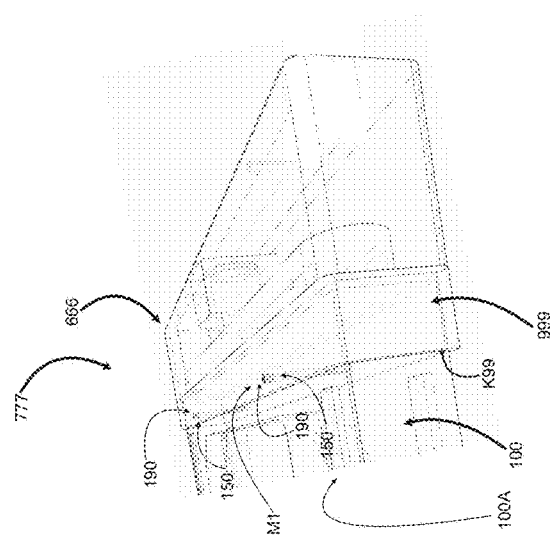

FIGS. 11A to 11C, with reference to FIGS. 1 through 10D, illustrate exemplary perspective views showing the sequence of assembly of the main tray body 100 with handle grabber 777 to complete the rotary tray holder in accordance with the embodiments herein. As shown, the front side 100E of the main tray body 100 may be positioned in the back female portion N55 of the receiving portion 999 of the handle grabber 777. Thereafter, screws 190 may be screwed through the holes 150 on top side M1 of the receiving portion 999. The screws 190 shall pass through holes 180 in the tray holder being configured to match holes 150 on the receiving portion 999, and thereafter, enter the holes 150 on the opposite bottom side M2 of the receiving portion 999.

Figure 12B:
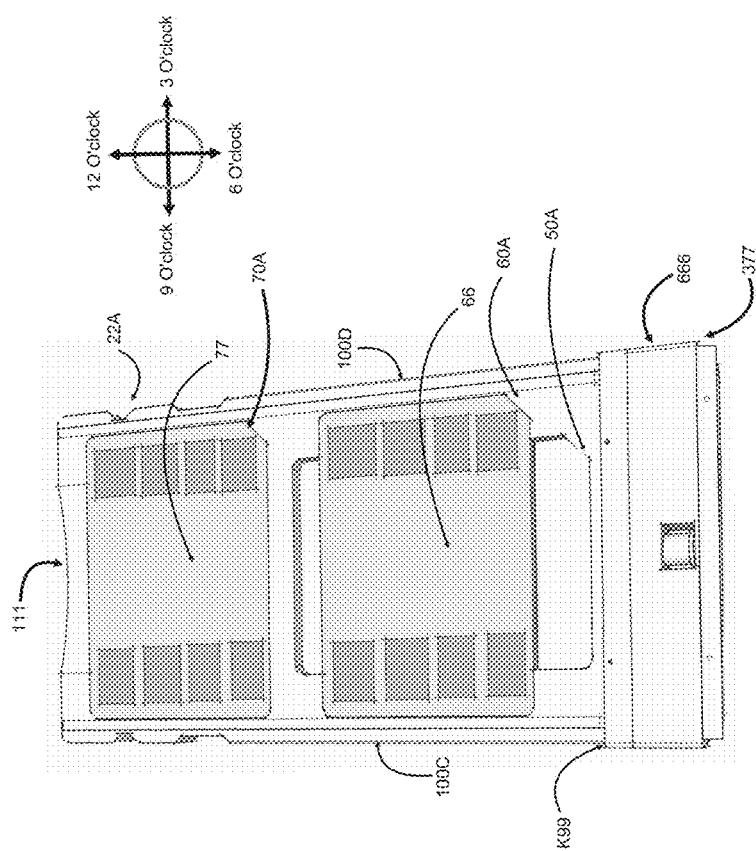
FIGS. 12A and 12B are exemplary perspective views respectively illustrating the top side and bottom side of the rotary tray holder showing an engagement relationship among the tray holder with the handle grabber, according to the embodiments herein.
Figure 12A:
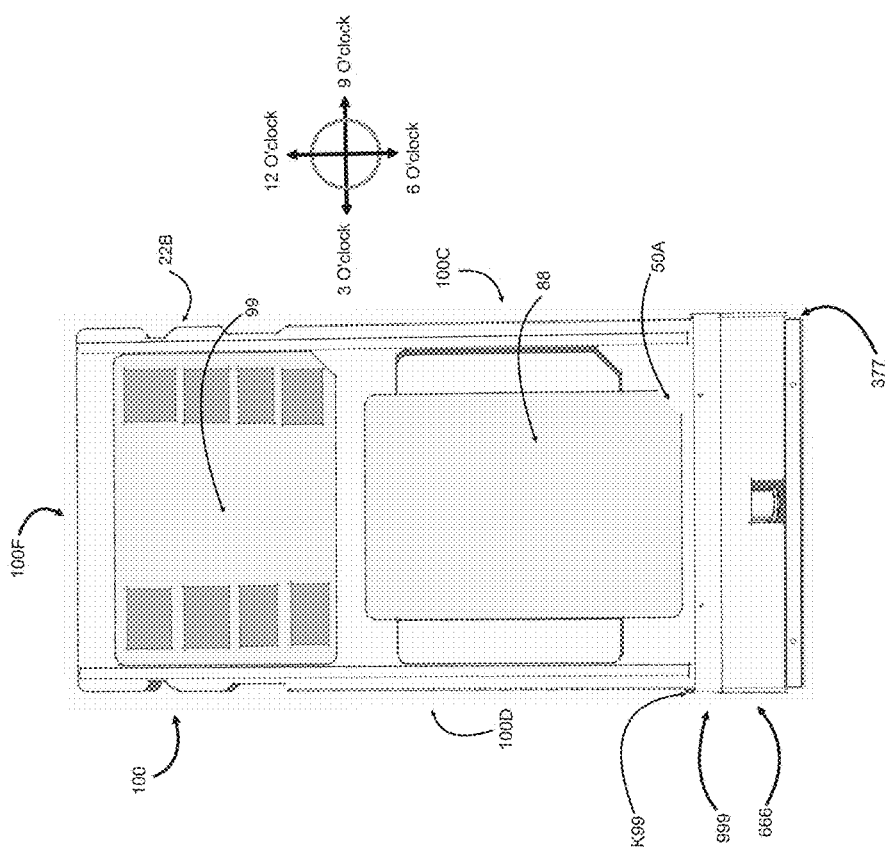

Referring to FIGS. 12A and 12B, with reference to FIGS. 1 through 11C, outer thickness of the four sides of the handle grabber 777, are higher than the main tray body 100 allowing the outer sides of the backside K99 to be exposed above the sides of the tray body 100. In addition, the outer surface of the back side K99 will be respectively adjacent to the first top window A at the top side 100A, and adjacent to the opposite fourth window B at the opposite side 100B.

Referring to FIGS. 13A and 13B, with reference to FIGS. 1 through 12B, the main tray body 100 may be pulled out of the handle grabber 777 to rotate the tray holder. Pulling the main tray body 100 out of the front female portion 355A of the handle grabber 777 shall require an external and sufficient force, due to the plurality of protruded male nodes 110 that are in engagement with the female receiving groove 110B need to slide out of their engagement. During the pulling action, the shaft 200 will travel out along the hole 204. Travel of the shaft 200 and consequently that of the tray holder shall be limited by the snap ring 400 that will make a contact with the inner side surface 44A of the receiving window 444 to prevent further travel, as shown in FIG. 13B. At this instance, the male portion 888 shall be fully disengaged from the front female portion 355A, enabling rotation of the main tray body 100 and the connecting portion 999 relative to the receiving portion 666 with the shaft 400 working as fulcrum. As may be seen, the tray holder may be rotated in any direction; i.e., clockwise or counterclockwise by any angle; i.e., 180 degrees or 360 degrees without any limitation as shown in FIGS. 14A to 14C, with reference to FIGS. 1 through 13B.

While the disclosure provided herein describes features in terms of preferred and exemplary embodiments, thereof numerous other embodiments, modifications, and variations within the scope and the spirit of the appending claims, will occur of persons of ordinary skill in art from a review of this disclosure, it is to be understood that the invention is not limited thereto. Other modifications, such as changing the direction of the SIM cards, or the direction of the shaft with snap ring, or the shape of the shaft and the snap ring into spherical or flatten shape or simplifying the rotational direction, are also within the scope of the invention, also not limited thereto. On the contrary, it is intended to cover various modifications, and similar arrangements and procedures, therefore should be accorded the broadest interpretation, so as to encompass all such modifications and similar arrangements and procedures. it is to be understood that many changes may be made therein without departing from the spirit and scope of the claims. It will also to be understood that various directional and orientational terms such as "twelve o'clock" and "six o'clock", "nine o'clock", and "three o'clock" and the like are used herein only for convenience, and that no fixed or absolute directional or orientational limitations are intended by the use of these words.

What is claimed is:

1. A rotary tray holder comprising:
   a tray holder body comprising a first side and a second side, wherein each of the first side and the second side comprises at least one window to hold at least one SIM card; and
   a handle grabber configured to allow rotation of the tray holder body to enable insertion of the tray holder body in an electronic device with any of the first side and the second side of the tray holder body oriented in a desired direction thereby enabling a first SIM card located in the at least one window on the side oriented in the desired direction to be active, and making a second SIM card located in the at least one window on the other side to take a standby position.

2. The rotary tray holder of claim 1, wherein the handle grabber comprises:
   a main connector portion fixed to the tray holder body and comprising a male portion on a face opposite the tray holder body and a shaft projecting out of the male portion; and
   a main receiver portion comprising a female portion configured to engage the female portion in any of two orientations that are 180 degrees apart, the main receiver portion further comprising a hole formed at a bottom of the female portion, wherein the hole is configured to receive the shaft and allow the main connector portion to rotate relative to the main receiver portion thereby enabling orientation of the tray holder body to be fixed to the main connector portion in any of the two orientations, and wherein the shaft moves axially along the hole for engagement and disengagement of the female portion with the male portion.

3. The rotary tray holder of claim 2, wherein the main receiver portion further comprises a receiving window positioned such that the hole opens in the receiving window.

4. The rotary tray holder of claim 3, wherein the shaft comprises a groove located near to end of the shaft, the groove configured to receive a snap ring after the shaft has been inserted in the hole, and wherein the snap ring is positioned in the groove through the receiving window.

5. The rotary tray holder of claim 4, wherein the snap ring holds and secures the shaft into the hole.

6. The rotary tray holder of claim 4, wherein the receiving window comprises two opposite sides that are perpendicular to an axis of the hole, the two opposite sides comprising a first side facing the hole and a second side bearing the hole, and wherein the first side and the second side control axial movement of the shaft in the hole between a first position that corresponds to end of the shaft engaging with the first side, and a second position that corresponds to the snap ring engaging with the second side.

7. The rotary tray holder of claim 6, wherein the female portion is fully disengaged from the male portion in the second position to enable rotation of the main connector portion, and wherein the female portion is fully engaged with the male portion in the first position to hold the connector portion in any of the two orientations.

8. The rotary tray holder of claim 7, further comprising side walls of the male portion comprising a plurality of male circular nodes that engage with a plurality of female receiving grooves of like shape positioned on inner side walls of the female portion in corresponding positions when the male portion is fully engaged with the female portion, wherein engagement of the nodes and receiving grooves securely holds the male portion inside the female portion.

9. A rotary tray holder comprising:
   a tray holder body comprising a first side and a second side, wherein each of the first side and the second side comprises at least one window to hold a SIM card; and
   a handle grabber configured to allow rotation of the tray holder body to enable insertion of the tray holder body in an electronic device with any of the first side and the second side of the tray holder body oriented in a desired direction,
   wherein the at least one window on each of the first side and the second side is formed by at least one recess that extends from one side towards side and penetrates through the other side, and
   wherein the at least one recess is divided between a window on the first side and a window on the second side by at least one divider located in the middle of the tray holder body.

10. The rotary tray holder of claim 9, wherein the at least one recess comprises a matching shape and size as of the SIM card to be held in the at least one window.

11. The rotary tray holder of claim 9, wherein the at least one divider provides a bottom face for the each of the windows located on the first side and the second side.

12. The rotary tray holder of claim 9, wherein each of the at least one window includes a guiding edge to enable holding of the SIM card in a desired position.

13. The rotary tray holder of claim 12, wherein the desired position includes a position of the SIM card with contacts of the SIM card facing upward to enable activation of the SIM card.

14. The rotary tray holder of claim 12, wherein the desired position includes a position of the SIM card with contacts of the SIM card facing downward that prevents activation of the SIM card.

15. A tray holder comprising a first side and a second side, wherein at least one of the first side and the second side comprising two or more windows to hold a SIM card, wherein at least one of the two or more windows, on at least one of the first side and the second side, partly overlaps with another window being oriented at an angle to the other window.

16. The tray holder of claim 15, wherein the at least one of the two or more windows that partly overlaps with another window is at 90 degrees to the other window being positioned lateral to the other window.

17. The tray holder of claim 15, wherein each of the two or more windows on the first side and the second side includes a guiding edge to enable holding the SIM card in a desired position.

18. The tray holder of claim 15, wherein the guiding edge of the one of the two overlapping windows is positioned such that the SIM card is held with contacts of the SIM card facing downward that prevents activation of the SIM card thereby holding the SIM card in a standby position, and wherein the guiding edge of the other window of the two overlapping windows is positioned such that the SIM card is held with contacts of the SIM card facing upward that enables activation of the SIM card, thereby holding the card in an active position.

19. The tray holder of claim 15, wherein only one of the two overlapping windows holds a SIM card at one time.

20. The tray holder of claim 19, wherein the two overlapping windows are of a same size to enable removal of the SIM card from one of the two overlapping windows and positioning it in another of the two overlapping windows to enable swapping of the active and the standby positions of the SIM card.

* * * * *

UNITED STATES PATENT AND TRADEMARK OFFICE
CERTIFICATE OF CORRECTION

PATENT NO. : 9,886,654 B1  
APPLICATION NO. : 15/681403  
DATED : February 6, 2018  
INVENTOR(S) : Adel Almorshedi Page 1 of 1

It is certified that error appears in the above-identified patent and that said Letters Patent is hereby corrected as shown below:

In the Specification

Column 5, Line 27, please delete "sixth window F" and in its place please insert --fifth window D--.

Column 9, Lines 34-35, please delete "hole 200 between a first position that corresponds to end of the shaft 203" and in its place please insert --hole 204 between a first position that corresponds to end of the shaft 200--.

Signed and Sealed this
Fourteenth Day of August, 2018

Andrei Iancu
*Director of the United States Patent and Trademark Office*